June 11, 1940. W. L. WELLS 2,203,852
VISIBILITY CONTROL WHEEL
Filed July 9, 1938 4 Sheets-Sheet 1

INVENTOR
WILLIS L. WELLS.
BY
ATTORNEY

June 11, 1940. W. L. WELLS 2,203,852
VISIBILITY CONTROL WHEEL
Filed July 9, 1938 4 Sheets-Sheet 2
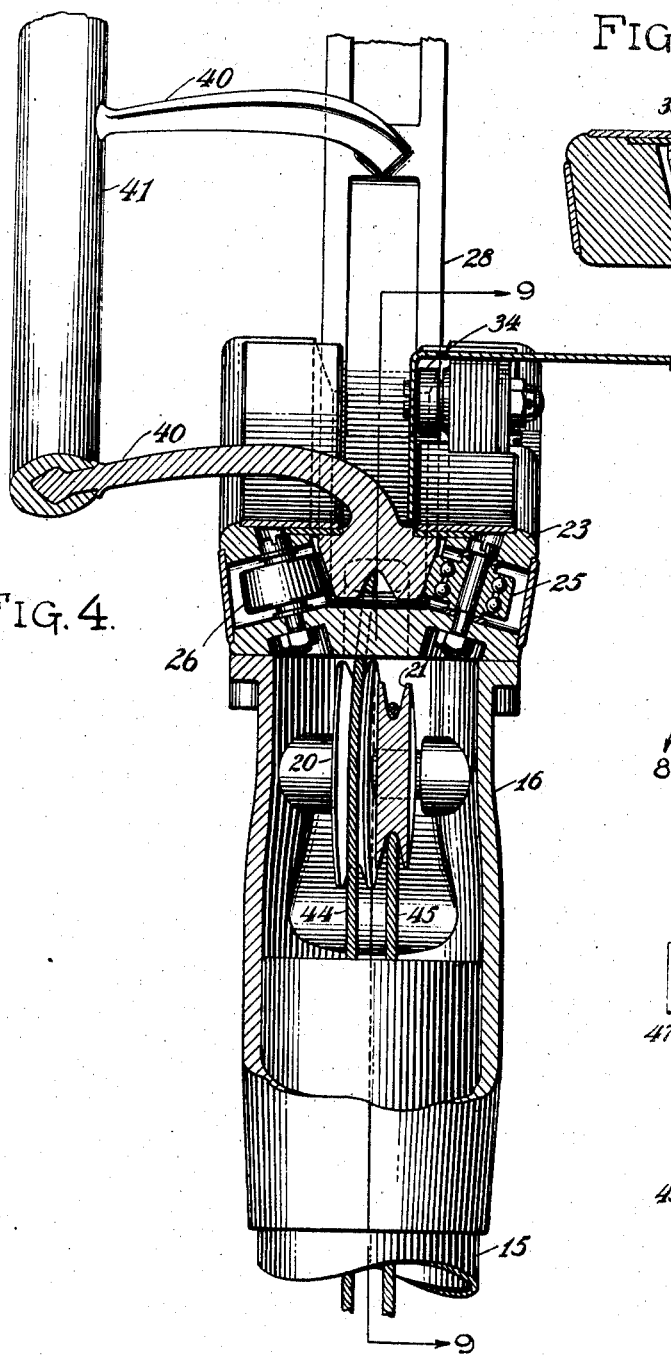
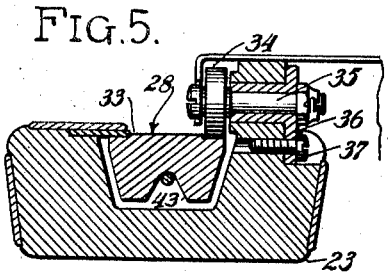
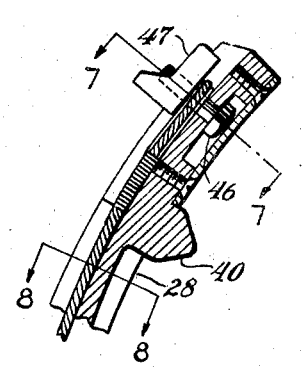
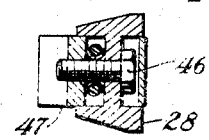
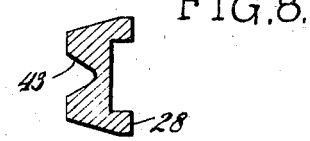
INVENTOR
WILLIS L. WELLS.
BY
ATTORNEY

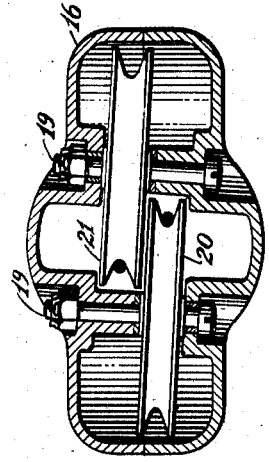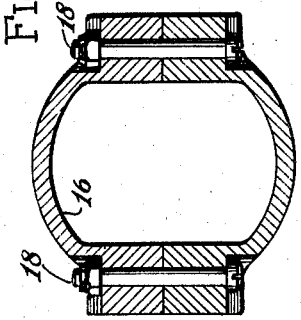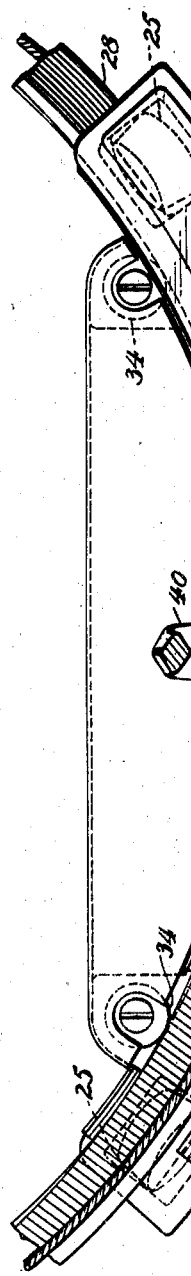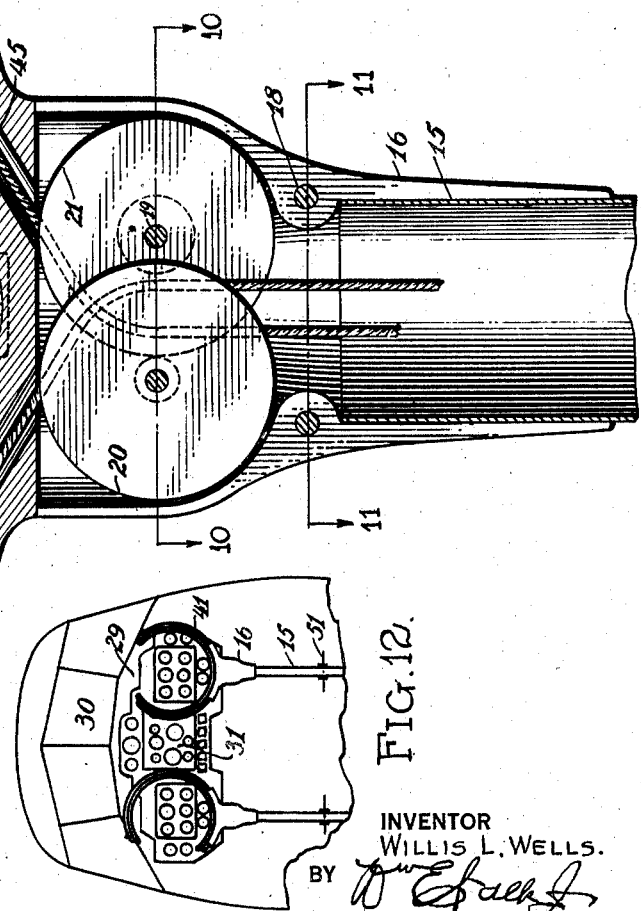

June 11, 1940. W. L. WELLS 2,203,852
VISIBILITY CONTROL WHEEL
Filed July 9, 1938 4 Sheets-Sheet 4

INVENTOR
WILLIS L. WELLS.
BY
ATTORNEY

Patented June 11, 1940

2,203,852

UNITED STATES PATENT OFFICE 2,203,852

VISIBILITY CONTROL WHEEL

Willis L. Wells, Clayton, Mo., assignor to Curtiss-Wright Corporation, a corporation of Delaware Application July 9, 1938, Serial No. 218,345

15 Claims. (Cl. 74—471)

This invention relates to control wheels, and is particularly applicable to use in aircraft incorporating a wheel control for ailerons.

In large aircraft the use of a wheel control is conventional, the wheel being mounted upon a column which is swingable fore and aft to afford longitudinal aircraft control, while the wheel is rotatable on its own axis to afford lateral control. Ordinarily, the wheel rim is supported by spokes upon a hub, which in turn is journaled at the top of the control column, suitable cables or gear means being utilized to transmit wheel movement to the ailerons. Since modern aircraft are provided with a large number of instruments on their control panels, which lie directly ahead of the control wheel, the conventional wheel with its spokes and hub tends to interfere with continuous observation of these instruments which is essential during flight, and it is an object of this invention to provide a wheel construction with a minimum of interfering elements so that observation through the wheel is unimpaired. In the prior art, designers have attempted to remedy the interfering characteristics of the conventional wheel by giving to the wheel peculiar rim shapes, and also by reducing its effective diameter as much as possible consistent with the ability of the pilot to effectively operate the wheel for control. However, reduction in diameter of the wheel increases the operating loads, inducing excessive pilot fatigue.

By this invention, the wheel diameter may be made as large as desirable—in fact, larger than has been conventional practice—whereby operating loads are reduced, this reduction in operating loads being one of the objects of the invention.

Another object of the invention is to provide a wheel structure in which there is no spoke or hub organization to interfere with instrument board, or other, visibility.

A further object is to so arrange the controls in connection with a spokeless and hubless control wheel that the actual loading of the wheel is transmitted directly to the control elements.

Still another object is to provide a wheel rim which is free from obstruction by supporting structure.

Further objects will be apparent from a reading of the annexed specification and claims, and in viewing the drawings, in which:

Figure 1:
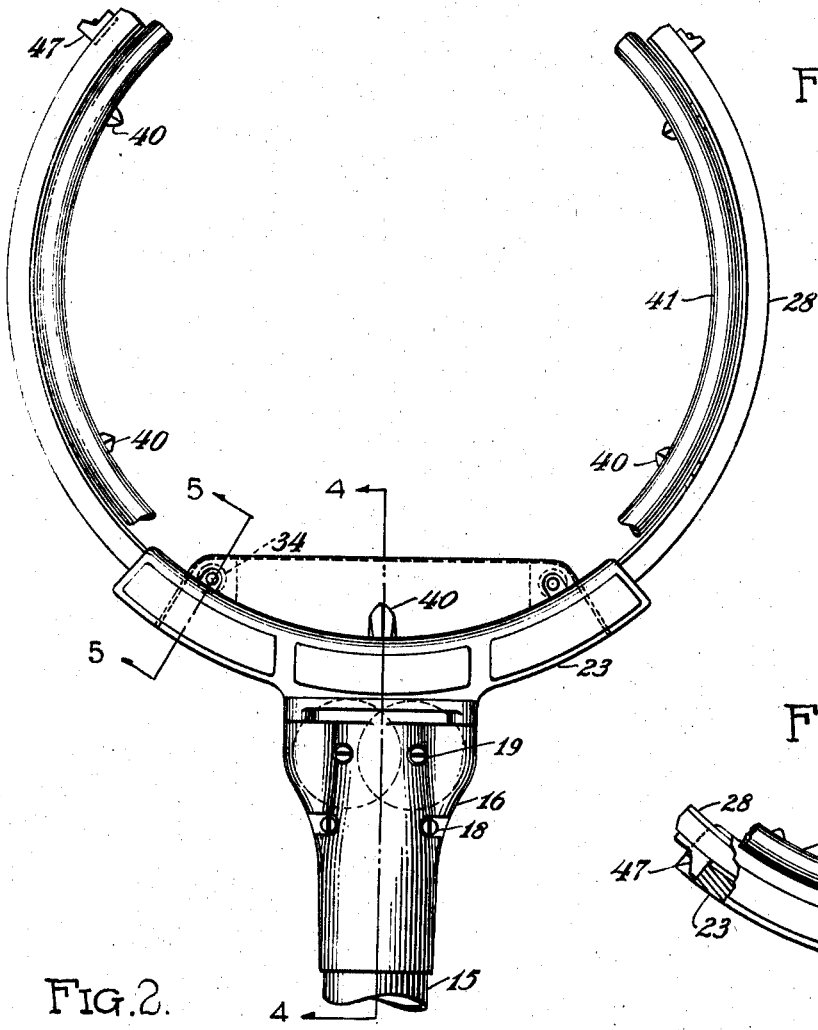
Fig. 1 is a front elevation of a control wheel according to this invention.
Figure 2:
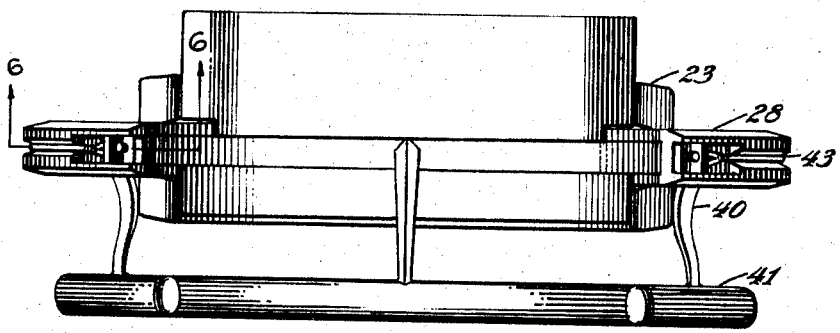
Fig. 2 is a plan.
Figure 13:
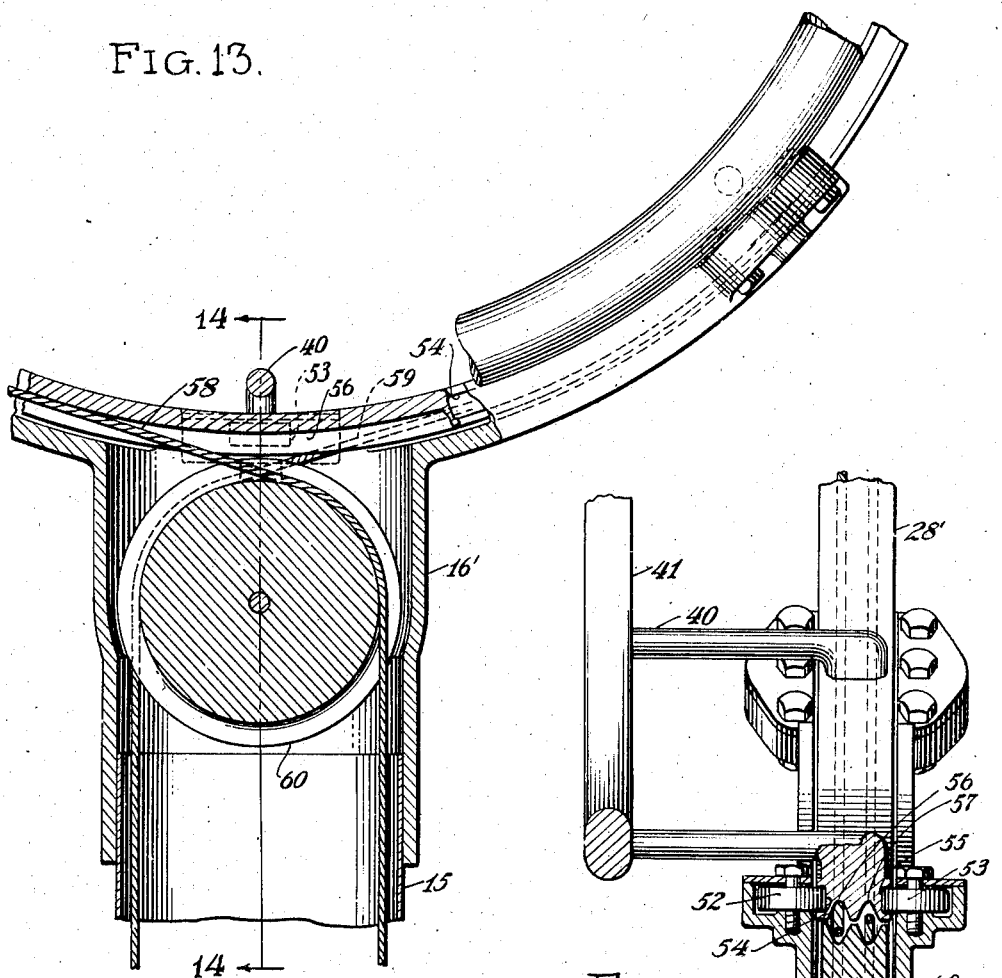
Figure 14:
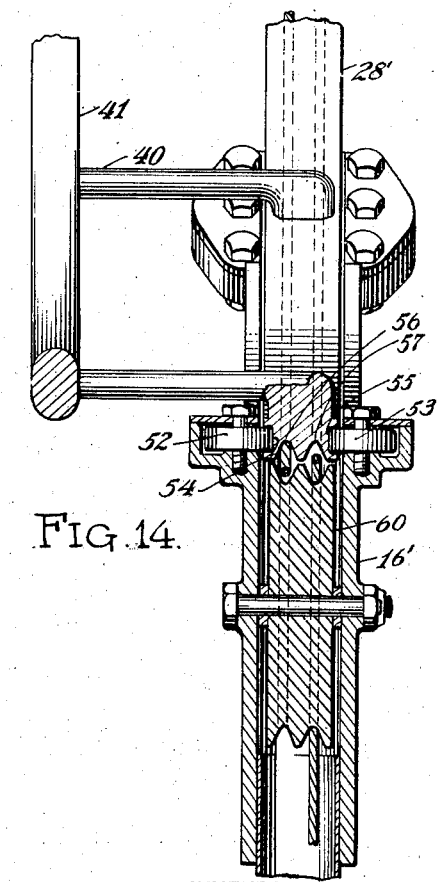

Figs. 4 and 5 are enlarged sections, respectively, on the lines 4—4 and 5—5 of Fig. 1;

Fig. 6 is a section on the line 6—6 of Fig. 2;

Figs. 7 and 8 are sections, respectively, on the lines 7—7 and 8—8 of Fig. 6;

Fig. 9 is a section on the line 9—9 of Fig. 4;

Figs. 10 and 11 are sections, respectively, on the lines 10—10 and 11—11 of Fig. 9;

Fig. 12 is a small scale diagrammatic elevation of a conventional aircraft pilot's compartment as viewed from the rear;

Fig. 13 is a fragmentary front elevation partly in section, through an alternative construction of control wheel; and Fig. 14 is a section on the line 14—14 of Fig. 13.

In Figs. 1 to 12, inclusive, 15 represents a tubular control column carrying, at its upper end, a hollow split fitting 16 held upon the column by clamp bolts 18 and by bolts 19 upon which are journaled sheaves 20 and 21. Fixed to the top of the fitting 16 is a track member 23 of segmental form having an arcuate embracement of approximately 80°. At the ends, and also at the middle of the member 23, are journaled opposed sets of rollers 25 and 26, the axes of these rollers being slightly tilted from a radius of the segmental track 23, as shown in Fig. 4. Resting upon and between the several sets of rollers 25 and 26 is an arcuate rail 28 concentric with the arc which describes the track 23. This rail has a considerable arcuate embracement, as shown in Fig. 1 and, in fact, may be a full annulus if so desired. Ordinarily, it is unnecessary to have a full annulus in the control wheels of aircraft and the cutout in the top part of the wheel, in normal level flight, permits of clear vision through the lower part of the windshield or toward the top of the instrument panel, as shown at 29 in Fig. 12, the windshield being designated at 30 therein and the instrument panel at 31.

The inner rim 33 of the rail 28 is formed as a track upon which spaced apart rollers 34 bear, these rollers being carried on journals 35 borne in bushings 36 screwed to the track member 23 as at 37. The rollers 34 hold the rail 28 firmly in the track, and the three sets of rollers 25 and 26 provide a firm bearing for the rail upon the column so that fore and aft forces imposed on the rail, to effect longitudinal aircraft control, are transmitted to the column 15 without unnecessary lost motion.

The rail is provided with a plurality of projections 40, extending more or less parallel to the axis of the rail to a point spaced from the column 15, these projections 40 carrying an arcuate rim 41 which may be grasped by the pilot. It is apparent that the rim 41 is clear of any interference by the track 23 or by the column 15, so that the operator may freely turn the rail 28 about its own axis.

Figure 3:
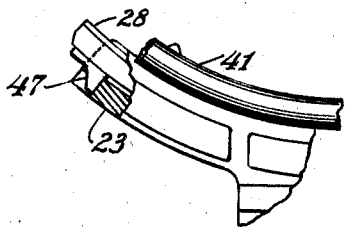
Fig. 3 is a detailed fragmentary view of the arrangement of Fig. 1 in a different position of adjustment.

The rail 28 is exteriorly grooved as at 43 to provide in effect a partial sheave within which ends 44 and 45 of a control cable may lie. The cables are clamped to the ends of the rail to a clevis joint, as shown at 46 in Fig. 6, the clevis bolt having a nut 47, readily extended to form a stop which, when the wheel is turned, as shown in Fig. 3, engages the end of the track 23 to prevent rotation of the rail within the track 23. The cables 44 and 45 are led through slanted drillings 49 and 50, respectively, in the track member 23, over the pulleys 20 and 21 and down through the column 15 to connect with the ailerons or other elements to be controlled. In operation, upon turning of the rim 41, the cables 44 and 45 will either wrap or unwrap upon the rail 28, paying cable on and off the rail to effect a translation of the cable for control movement.

Fig. 12 indicates how the system of the invention might appear in a conventional aircraft cabin, and it will be apparent that those instruments of the panel 31 which lie in line with the control wheel are plainly visible without any interference, since there is no hub or spoke structure, or column extension, to restrict visibility. As indicated in the beginning of the specification, the control column 15 is pivoted as at 51 in Fig. 12, for fore and aft motion to afford longitudinal aircraft control in the conventional manner.

Figs. 13 and 14 show an alternative arrangement of pulleys, cable, and rail support, in which the rail 28' is carried by pairs of spaced rollers 52 and 53 engaging side grooves 54 and 55 in the rail. The rail is provided with two peripheral grooves 56 and 57 in which control cables 58 and 59 respectively lie, these cables being oppositely wrapped upon a double-grooved sheave 60 in a fitting 16'. The operation of the arrangement of Figs. 13 and 14 is identical with that of the first embodiment, but the sheave 60 performs the same function as that formed by the sheaves 20 and 21 of the prior embodiment, and the rollers 52 and 53 serve the same function as the rollers 25, 26 and 34 of the first embodiment. In other respects, similar parts of the structure of Figs. 13 and 14 are numbered in the same manner as in the first embodiment.

The second embodiment of the invention (Figs. 13 and 14) may lend itself to a greater angle of rotation of the rim 41, each cable 58 and 59 being susceptible to virtually one complete turn about the rail 28' if the latter be of annular form.

In either embodiment, the hand travel in moving the wheel substantially equals the cable travel, and thus it can be readily determined that no loads greater than the strength in a man's arms can be imposed on the system. It is believed that this will eliminate the highly concentrated loads which are normally present in systems employing gearing, or sprockets and chains. It is further believed that this type of control wheel will reduce an accident hazard present in conventional types, in the event of minor crashes and forced landings with the wheels of the landing gear retracted. The total absence of any hub or spoke structure in the center of the wheel should allow the pilot to receive the impact of a sudden stop on his shoulders, while his head and face may pass through the center of the wheel. There have been many instances where an aircraft has stopped suddenly, where the pilot's face has been badly cut and injured, due to his head being thrown against the wheel or against the instrument board. In the use of this wheel, the rim provides abutments against which his shoulders may strike, leaving ample clear space forward of the wheel with no obstructions against which his head may impinge.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A control wheel structure for aircraft comprising a support having a segmental guide member, an arcuate rail circumferentially movable thereon, pulleys on the support, cables running over said pulleys and extending around and attached at their ends to said rail, an arcuate rim substantially coextensive with the rail and axially spaced therefrom, and brackets joining the rail and rim.

2. In a control structure in combination, a tubular support having pulleys journaled on a transverse axis toward one end, laterally spaced rollers journaled on the support, an arcuate rail carried by said rollers, cables wrapped partly upon said rail reeved over said pulleys, and an arcuate hand rim carried by and spaced from said rail and rollers to afford operating means for the rail free of interference by said support and rollers.

3. In a control structure in combination, a tubular support having pulleys journaled on a transverse axis toward one end, laterally spaced rollers journaled on the support, an arcuate rail carried by said rollers, and an arcuate hand rim carried by and spaced from said rail and rollers to afford an operating means for the rail free of interference by said support and rollers.

4. In an aircraft control structure, a hollow column mounted for fore-and-aft swinging for longitudinal aircraft control, a transverse segmental guideway secured atop the column and having an arcuate embracement of approximately one quadrant, rollers along said guideway defining a concentric arcuate track, a segmental spokeless rail carried on said rollers and embraced in part by said guideway, said rail having a circumferential groove therein, pulleys within said guideway having their grooves alined with the rail groove and with the column hollow, and cables secured to said rail reeved over said pulleys and through said column to provide aircraft lateral control means actuated by turning of said rail in said guideway.

5. In an aircraft control structure, a hollow column mounted for fore-and-aft swinging for longitudinal aircraft control, a transverse segmental guideway secured atop the column and having an arcuate embracement of approximately one quadrant, rollers along said guideway defining a concentric arcuate track, a segmental spokeless rail carried on said rollers and embraced in part by said guideway, said rail having a circumferential groove therein, pulleys within said guideway having their grooves alined with the rail groove and with the column hollow, cables secured to said rail reeved over said pulleys and through said column to provide aircraft lateral control means actuated by turning of said rail in said guideway, brackets extending from one face of the rail located to pass the guideway in clearance relation to permit of full turning of the rail relative to the guideway, and a hand rim concentric with the rail and substantially coextensive therewith secured to said brackets and lying in axially spaced relation to said rail and guideway.

6. In an aircraft control, a hollow column mounted for fore-and-aft swinging, a fitting at the top thereof defining a laterally extending arcuate slotted guideway, an arcuate rail rotatable in said guideway and secured therein, whereby the rail serves as an operating means to effect column swinging, spaced arms on the rail disposed to pass through the guideway slot and extending to one side of the fitting, a hand rim secured to said arms, and control connections from said rail passing through said fitting and column for attachment to means to be controlled.

7. In an aircraft control, a hollow column mounted for fore-and-aft swinging, a fitting at the top thereof defining a laterally extending arcuate slotted guideway, an arcuate rail rotatable in said guideway and secured therein, whereby the rail serves as an operating means to effect column swinging, spaced arms on the rail disposed to pass through the guideway slot and extending to one side of the fitting, a hand rim secured to said arms, and control connections from said rail passing through said fitting and column for attachment to means to be controlled, said control connections comprising cables extending around the rail periphery, and pulleys over which said cables are reeved journalled within said fitting.

8. In aircraft, a spokeless, hubless, control member comprising an arcuate rim, means mounting said rim for concentric rotation disposed at the lowest part of the rim so as to allow of clear view through the rim, a swingably mounted carrying structure for said mounting means and rim swingable by fore-and-aft bodily movement of the rim, and connections respectively from the rim to the lateral control devices and from the carrying structure to the longitudinal control devices of the aircraft.

9. In aircraft, a spokeless, hubless arcuate member having substantially three quadrants of arcuate embracement, an arcuate guideway having substantially one quadrant of arcuate embracement upon which said member is mounted for rotative movement, stops at the member ends preventing passage of a member end into the guideway, thereby permitting of member rotation through substantially one quadrant in either direction from the neutral position, and cable means passing through the guideway, reeved around said member and secured adjacent the member ends by which rim rotative movement is transmitted to devices to be controlled.

10. In aircraft, a spokeless, hubless arcuate member having substantially three quadrants of arcuate embracement, an arcuate guideway having substantially one quadrant of arcuate embracement upon which said member is mounted for rotative movement, stops at the member ends preventing passage of a rim end into the guideway, thereby permitting of member rotation through substantially one quadrant in either direction from the neutral position, cable means passing through the guideway, reeved around said member and secured adjacent the member ends by which member rotative movement is transmitted to devices to be controlled, and a swingable column at the top of which said guideway and member are mounted and through which said cables pass.

11. In a control structure, in combination, a support having laterally spaced rollers journaled thereon, an arcuate rail turnably carried by said rollers, the plane of the rail being substantially vertical and said support being movable in a fore-and-aft direction by force application to the rail, an arcuate hand rim carried by and spaced from the rail to afford operating means for the rail free of interference by said rollers and support, control devices actuated by turning of the rail on the support and other devices actuated by movement of the support.

12. In a control structure, a pair of laterally spaced rollers, a spokeless arcuate rail contacting and rolling upon said rollers, the latter being spaced apart a distance approximately equal to a quadrant of the rail, and a control cable reeved around the rail and paying off the rail between said rollers.

13. In a control structure, a spokeless arcuate rail disposed in a transverse substantially vertical plane and having a peripheral groove, a pair of laterally spaced rollers upon which said rail is rollable, the rollers and rail being swingable jointly fore-and-aft for a control function, and a cable in the rail groove paying on and off the rail between said rollers for actuating means to be controlled in response to rail rotation.

14. In an operator's control for a vehicle having a cabin, a spokeless arcuate rail disposed for the operator to have forward vision therethrough, a support mounted in the cabin for fore-and-aft movement, rollers in said support engaging said rail for fore-and-aft movement thereof with the support, a pair of pulleys in the support, a control cable reeved over the pulleys and onto the rail and extending from the pulleys to means to be controlled, and further control means operated by fore-and-aft movement of the support.

15. Control means including a swinging support member, a spokeless rail extending from the member, guide rollers mounted in the member and engaging opposite sides of said rail whereby the rail and support are constrained to joint swinging, a pair of pulleys mounted in said member, a control cable wrapped around said pulleys and rail for operation by rail rotation, and a second control means operated by swinging of the member and rail.

WILLIS L. WELLS.